United States Patent [19]
Brint et al.

[11] Patent Number: 6,070,356
[45] Date of Patent: *Jun. 6, 2000

[54] ANIMATED DECOY HAVING AN INSERTABLE DECOY MOVEMENT DEVICE

[75] Inventors: George W. Brint, Bolivar; Gary W. Cook; Damon E. Fielder, both of Jackson, all of Tenn.

[73] Assignee: Advanced Decoy Research, Inc., Bolivar, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/689,462

[22] Filed: Aug. 8, 1996

[51] Int. Cl.$^7$ .................................................. A01M 31/06
[52] U.S. Cl. ........................................... 43/2; 43/3
[58] Field of Search ............................... 43/2, 3; 446/156, 446/158

[56] References Cited

U.S. PATENT DOCUMENTS

| | | |
|---|---|---|
| 282,851 | 8/1883 | Danz ............................................. 43/3 |
| 403,595 | 5/1889 | Jencks . |
| 410,523 | 9/1889 | Jencks . |
| 673,846 | 5/1901 | Rauert ........................................... 43/3 |
| 717,790 | 1/1903 | Yorke . |
| 1,603,114 | 10/1926 | Johnson . |
| 1,663,009 | 3/1928 | Johnson ......................................... 43/3 |
| 2,162,786 | 6/1939 | Oeding .......................................... 43/3 |
| 2,185,013 | 12/1939 | Bonetti .......................................... 43/3 |
| 2,460,128 | 1/1949 | Greenleaf ....................................... 43/3 |
| 2,748,519 | 6/1956 | Dennison et al. .............................. 43/3 |
| 2,787,074 | 4/1957 | Miller ............................................ 43/3 |
| 3,000,128 | 9/1961 | McAda .......................................... 43/3 |
| 3,047,972 | 8/1962 | Taylor ........................................... 43/3 |
| 3,350,808 | 11/1967 | Mitchell ........................................ 43/3 |
| 3,689,927 | 9/1972 | Boston ..................................... 343/225 |
| 4,322,908 | 4/1982 | McCrory ....................................... 43/3 |
| 4,566,214 | 1/1986 | McCrory et al. .............................. 43/3 |
| 4,612,722 | 9/1986 | Ferrell ........................................... 43/3 |
| 4,852,288 | 8/1989 | Payne et al. ................................... 43/2 |
| 4,893,428 | 1/1990 | Gagnon ......................................... 43/3 |
| 4,965,953 | 10/1990 | McKinney .................................... 43/2 |
| 5,036,614 | 8/1991 | Jackson ......................................... 43/3 |
| 5,199,204 | 4/1993 | Lowery ......................................... 43/2 |
| 5,233,780 | 8/1993 | Overholt ....................................... 43/2 |
| 5,377,439 | 1/1995 | Ross et al. .................................... 43/3 |
| 5,392,554 | 2/1995 | Farstad et al. ................................ 43/3 |
| 5,459,958 | 10/1995 | Reinke .......................................... 43/2 |
| 5,515,637 | 5/1996 | Johnson ........................................ 43/2 |
| 5,546,692 | 8/1996 | Byers ............................................ 43/2 |

FOREIGN PATENT DOCUMENTS

| | | |
|---|---|---|
| 389522 | 3/1933 | United Kingdom ......................... 43/2 |
| 621277 | 4/1949 | United Kingdom ......................... 43/2 |
| 2131266 | 6/1984 | United Kingdom ......................... 43/2 |

*Primary Examiner*—Kurt Rowan
*Attorney, Agent, or Firm*—Garrison, Morris & Haight, PLLC

[57] ABSTRACT

An animated decoy comprising a generally hollow decoy body having an inner surface wherein a freely movable self-contained decoy movement device is placed in a predetermined location within the decoy body for random movement therein. The movement device randomly impacts the inner surface of the decoy body causing the decoy body to move in a predetermined manner. A generally flexible support rod having first and second ends is provided for flexibly and pivotally supporting the decoy body a predetermined distance above the ground. The first end of the support rod engages the decoy body while the second end is inserted a predetermined distance into the ground. In operation, the support rod is flexibly responsive to the movement of the decoy body. As alternative embodiments of the present invention, the decoy movement device is attached directly to the support rod or is secured between the sidewalls of the decoy body. The present invention also defines a method and kit of parts for converting a non-animated decoy into an animated decoy.

16 Claims, 5 Drawing Sheets

ANIMATED DECOY HAVING AN INSERTABLE DECOY MOVEMENT DEVICE

BACKGROUND

The present invention relates generally to animated decoys for hunters and photographers, and more particularly, to lightweight wild game decoys having an insertable self-contained decoy movement device strategically positioned therein for causing the decoy to move in a specific life-like manner. In even greater particularity, the present invention relates to the methodology used for inserting a self-contained decoy movement device into a particular type of wild game decoy in a predetermined location to obtain specific life-like movement.

Decoys of great variety in construction and purpose have been used for centuries to lure wild animals into range for harvest and/or observation and study. While decoys often provide a life-like appearance, it has also been desirable for obvious reasons to make the decoy move in a life-like fashion. Faced with this challenge, practitioners in the art have endeavored on many occasions to so motivate a decoy. For instance, some decoys are designed to move with nature's forces, i.e., wind or water. However, imperfect conditions and inherent limitations in the design and surrounding environment generally cause these decoys to exhibit atypical or unrealistic movement which may startle or warn the intended wild animal or may have no affect whatsoever.

In an attempt to remedy the above problems associated with nature activated decoys, several mechanized decoys have been designed with some being controlled remotely. A major disadvantage in all of the mechanized decoys, however, is that the means used for imparting movement to the decoy is a permanent part of the decoy design itself (i.e., permanently mounted in a single location). As such, it is widely known that these mechanized decoys, especially ones having moving extremities, are complex structures and are often unreliable, especially difficult to store and transport, and difficult to assemble, operate and maintain operation from a remote distance. Moreover, they tend to have a limited range of capabilities and too often provide poor simulation of some animal movements.

While the various mentioned prior art decoys function as apparatus for attracting wild animals or game, certain inherent deficiencies preclude adequate, satisfactory performance for the purpose of luring a desired species. In order to combat these varied problems, some form of simplified animated decoy is highly desirable which is simple to assemble, transport and operate and is capable of accurately emulating an extremely wide variety of typical or appropriate game or feral animal behavioral patterns or movements.

SUMMARY

Accordingly, it is therefore an object of the present invention to provide a simplified animated decoy which has realistic movement, is lightweight and readily portable.

It is another object of the present invention to provide a simplified animated decoy which is constructed of a small number of simple and easily assembled components.

A further object of the present invention is to provide a simplified animated decoy which is constructed of inexpensive lightweight materials and is rugged and durable in use.

A still further object of the present invention is to provide a simplified animated decoy which will operate reliably for sustained periods of time without any significant intervention by the user.

Other objects of the present invention will become apparent from time to time throughout the specification and claims as hereinafter related.

The above noted objects and other objects of the present invention are accomplished by an animated decoy comprising a generally hollow decoy body having an inner surface wherein a freely movable self-contained decoy movement device is placed in a predetermined location within the decoy body for random movement therein. In operation, the movement device randomly impacts the inner surface of the decoy body causing the decoy body to move in a predetermined manner. A generally flexible support rod having first and second ends is provided for flexibly and pivotally supporting the decoy body a predetermined distance above the ground. The first end of the support rod extends into and engages the decoy body whereas the second end is inserted a predetermined distance into the ground. During operation, the support rod is flexibly responsive to the movement of the decoy body.

In an alternative embodiment of the present invention, the animated decoy comprises a decoy body having a pair of generally flat sidewalls disposed in side by side relation and connected together at their upper margins. The sidewalls have the profile of a particular animal to be simulated. An insertable self-contained decoy movement device is inserted in a predetermined location between the sidewalls of the decoy body for causing the decoy body to move in a predetermined manner. This particular embodiment may also utilize the above described flexible support rod.

In another alternative embodiment of the present invention, the animated decoy comprises a generally hollow decoy body and generally flexible support rod as described for the first embodiment. However, in this embodiment, a self-contained decoy movement device is secured directly to the support rod for imparting movement to the decoy body.

There are several advantages of the present invention. Most importantly, the decoy movement device is a power source that is structurally independent from the decoy body itself, therefore may be adapted for use in the thousands of decoys already owned by hunters and photographers. The movement device imparts realistic movement to the decoy body which simulates specific behavior patterns or movements of wildlife activities. Structurally, the movement device includes a generally hollow spherical housing having attachable upper and lower portions. A battery powered electric motor and counterweight are operatively attached within the lower portion of the housing for rotation therein. The movement of the counterweight within the housing provides a random motion of the device itself and when placed in strategic locations within different decoys is successful in duplicating realistic movements of specific wildlife species. Thousands of hours of field work using the movement device within a wide variety of decoys has confirmed that the movement of the decoy is critical to the believability of its "authenticity" in the minds of instinctive wildlife species that may observe it.

Depending upon the methodology used to place the movement device in the decoy body, specific movement behavior can be duplicated such as feeding movement of deer or any deer-like wildlife, swimming movement of waterfowl, feeding movement of waterfowl in water and on dry land, panic movements of wounded deer or small animals (rabbits, dogs, groundhogs, etc.) to attract predators such as foxes, coyotes, bobcats, mountain lions, or bear. These movements include the feeding behavior of both sexes of wild turkey and the strutting movements of male turkeys which encompass both movements of quivering tail fans and the circular rotation of the bird as he struts. No other method of decoy movement can remotely compare with the variability of movements produced in such a wide array of decoy species.

The decoy movement provided by the movement device is always in relation to a flexible support rod that is inserted into the ground which holds the decoy body in position. The depth of the rod in the ground (which affects the amount of the bending afforded) and the position of the movement device in the decoy provides a wide variety of movement patterns available.

There has thus been outlined, rather broadly, many of the important features of the present invention in order that the detailed description thereof that follows may be better understood, and that the present contribution to the decoy industry may be better appreciated. There are, of course, numerous other novel features of the present invention that will become apparent from a study of the drawings and the description which will form the subject matter of the claims appended hereto. Moreover, it is to be understood that the phraseology and terminology employed herein are for the purpose of description and should not be regarded as limiting. As such, those skilled in the art will appreciate that the conception, upon which this disclosure is based, may readily be utilized as a basis for the designing of other decoys for carrying out the several purposes of the present invention. It is important, therefore, that the claims be regarded as including such equivalent decoys insofar as they do not depart from the spirit and scope of the present invention.

BRIEF DESCRIPTION OF THE DRAWINGS

These and other features, aspects, and advantages of the present invention will become better understood with regard to the following description, appended claims, and accompanying drawings where:

DESCRIPTION

Figure 10:
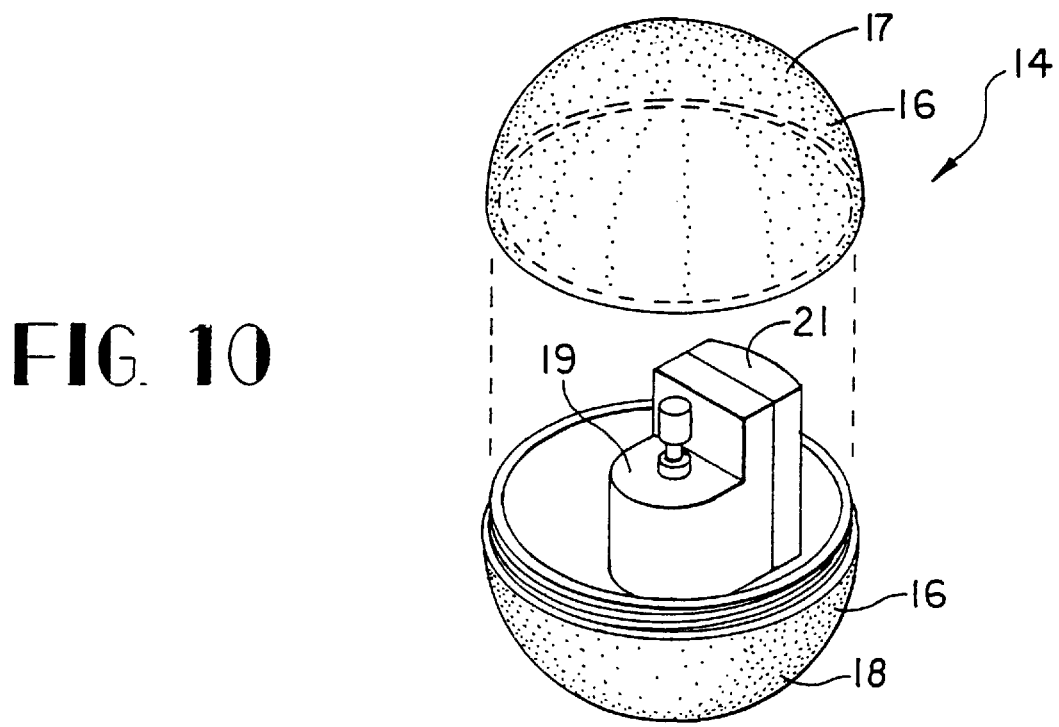
FIG. 10 is an exploded perspective view of a decoy movement device in accordance with the present invention.

With reference now to the drawings, FIGS. 1, 2, 4 and 5 disclose an animated decoy 10 compromising a generally hollow decoy body 11 having a hollow interior 12 with an inner surface 13. A freely movable self-contained decoy movement device 14 is strategically positioned in a predetermined location within the interior 12 of the decoy body 11 for random movement therein. During operation, movement device 14 randomly impacts the inner surface 13, which is preferably constructed out of thin, lightweight plastic that is collapsible. A freely movable self-contained decoy movement device 14 is strategically positioned in a predetermined location within the interior 12 of the decoy body 11 for random movement therein. During operation, movement device 14 randomly impacts the inner surface 13 of the decoy body 11 causing body 11 to move in a predetermined manner. Referring to FIG. 10, movement device 14 is preferably comprised of a generally hollow spherical housing 16 having attachable upper 17 and lower 18 portions. A battery powered electric motor 19 and a counter weight 21 connected to motor 19 are operatively attached within lower portion 18 for rotation therein. The rotation of counterweight 21 within housing 16 provides a random motion of the device 14 itself and, when strategically placed within decoy body 11, is successful in duplicating realistic movements of a specific wildlife species. An opening 22, which may include a flap 23, is formed in decoy body 11 for allowing device 14 to be inserted therethrough.

Decoy 10 may further include a generally flexible support rod 24 having first 26 and second 27 ends for flexibly and pivotally supporting the decoy body 11 a predetermined distance above the ground 28. Support rod 24 may be constructed out of any suitable material such as aluminum or wood, but is preferably 3–5 feet in length and has a diameter ranging approximately from ¼–½ inches. The first end 26 of the support rod 24 extends into and engages the decoy body 11 whereas the second end 27 is inserted a predetermined distance, preferably 4–12 inches, into the ground 28, which affects the amount of bending afforded. During operation, support rod 24 is flexibly responsive to the movement of decoy body 11.

Figure 1:
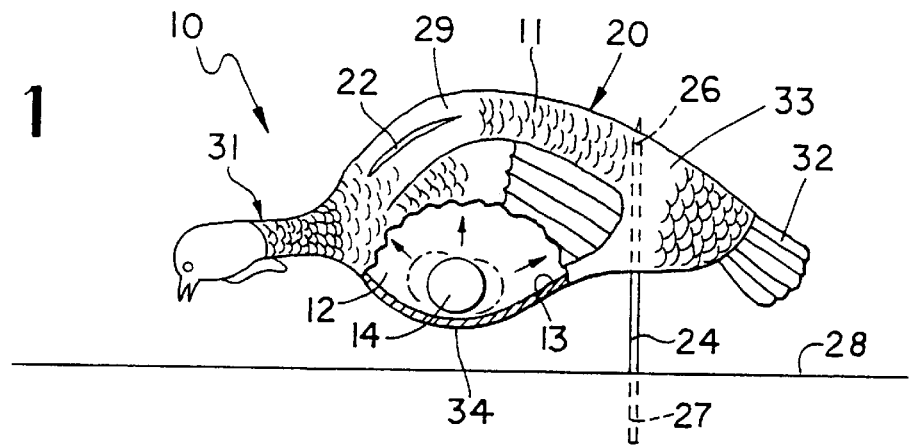
FIG. 1 is a side elevational view, partially in section, of a generally hollow wild turkey hen decoy mounted on a flexible support rod and showing a decoy movement device freely positioned within the decoy for imparting movement to the decoy in accordance with the present invention.

Referring to FIG. 1, decoy body 11 is illustrated as a wild turkey hen decoy body 20 having a central body torso 29, a head and neck member 31 positioned in a generally head down feeding position relative to torso 29, and a tail member 32. Torso 29 includes a lower back portion 33 and a breast portion 34. The first end 26 of the support rod 24 extends through decoy body 20 and engages the lower back portion 33 so as to allow the breast portion 34 to be positioned slightly lower than the tail member 32. Movement device 14 is inserted through opening 22 and feebly positioned in the breast portion 34. By positioning the breast portion 34 slightly lower than the tail member 32, the movement of device 14 is generally confined to the breast portion 34 of torso 29. During operation, the random movement of device 14 within breast portion 34 imparts a bobbing motion to the decoy body 20 which is indicative of a feeding turkey. Preferably, the breast portion 34 is positioned approximately 4–6 inches above the ground 28 so that the head and neck member 31 and breast portion 34 will not bob downwardly contacting the ground 28 and to further allow the decoy body 20 to pivot or rotate on support rod 24.

Figure 2:
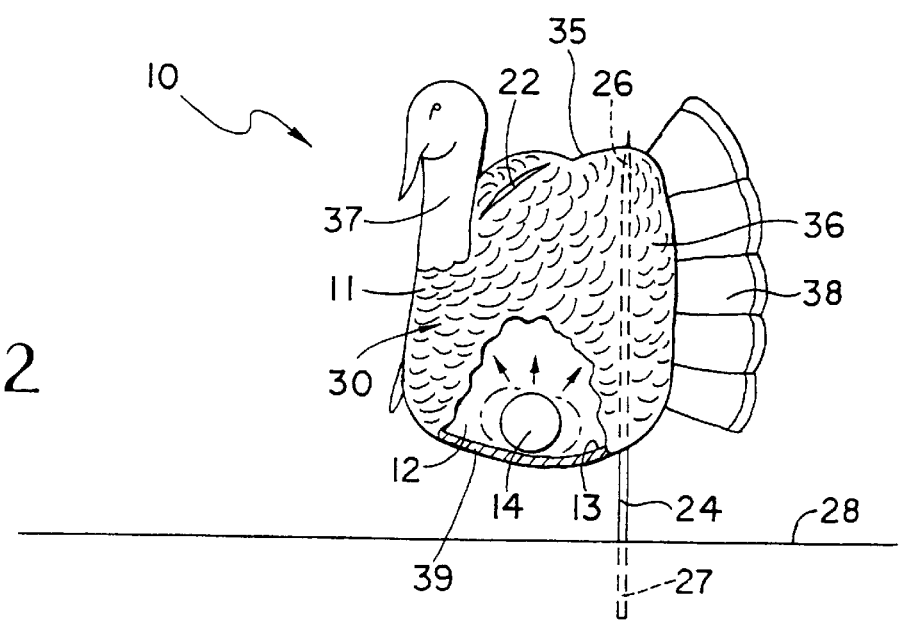
FIG. 2 is a side elevational view, partially in section, of a generally hollow wild turkey gobbler decoy mounted on a flexible support rod showing a decoy movement device freely positioned within the decoy for imparting movement to the decoy in accordance with the present invention.

Referring to FIG. 2, decoy body 11 is illustrated as a wild turkey gobbler decoy body 30 having a central body torso 36, a head and neck member 37, and a tail member 38. Torso 36 includes a breast portion 39 and a back portion 35. The first end 26 of support rod 24 extends through torso 36 and engages back portion 35 in close proximity for the tail member 38 so as to allow the breast portion 39 to be positioned slightly lower than the tail member 38. Movement device 14 is inserted through opening 22 and freely positioned in the breast portion 39. By positioning the breast portion 39 slightly lower than the tail member 38, the movement of device 14 is generally confined to the breast portion 39 of torso 36. During the operation, random movement of device 14 in breast portion 39 impacts a walking in place (i.e., bobbing) motion to the decoy body 39. Again, the breast portion 34 is preferably positioned approximately 4–6 inches above the ground 28 to assure that the breast portion 39 will not contact the ground 28 during operation and to further allow the decoy body 30 to pivot or rotate or support rod 24.

Figure 5:
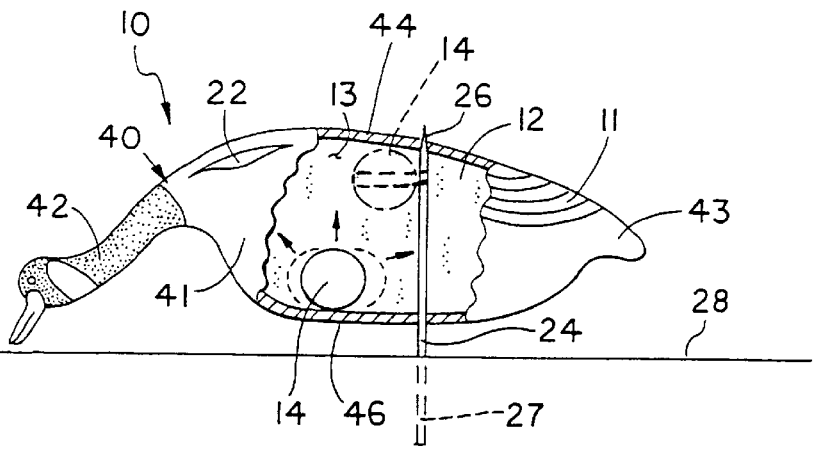
FIG. 5 is a side elevational view, partially in section, of a generally hollow goose decoy mounted on a flexible support rod showing alternate positions of a decoy movement device positioned within the decoy for imparting movement to the decoy in accordance with the present invention.

Referring to FIG. 5, decoy body 11 is illustrated as a goose decoy body 40 having a central body torso 41, a head and neck member 42 positioned in a generally head down feeding position relative to torso 41, and a tail member 43. Torso 41 includes a back portion 44 and a breast portion 46. The first end 26 of the support rod 24 extends through decoy body 40 and engages back portion 44 of torso 41 approximately midway between the head and neck member 42 and the tail member 43. Body 40 may be positioned on support rod 24 such that breast portion 46 is slightly lower than the tail member 43. Movement device 14 is inserted through opening 22 and freely positioned in the breast portion 46. The random movement of device 14 in breast portion 46 impacts a random bobbing or feeding motion to the decoy body 40. Again, the breast portion 46 is preferably positioned approximately 4–6 inches above the ground 28 to substantially prevent contact between the breast portion 46 and the head and neck member 42 and the ground 28 and to further allow the decoy body 40 to pivot or rotate on support rod 24.

Figure 4:
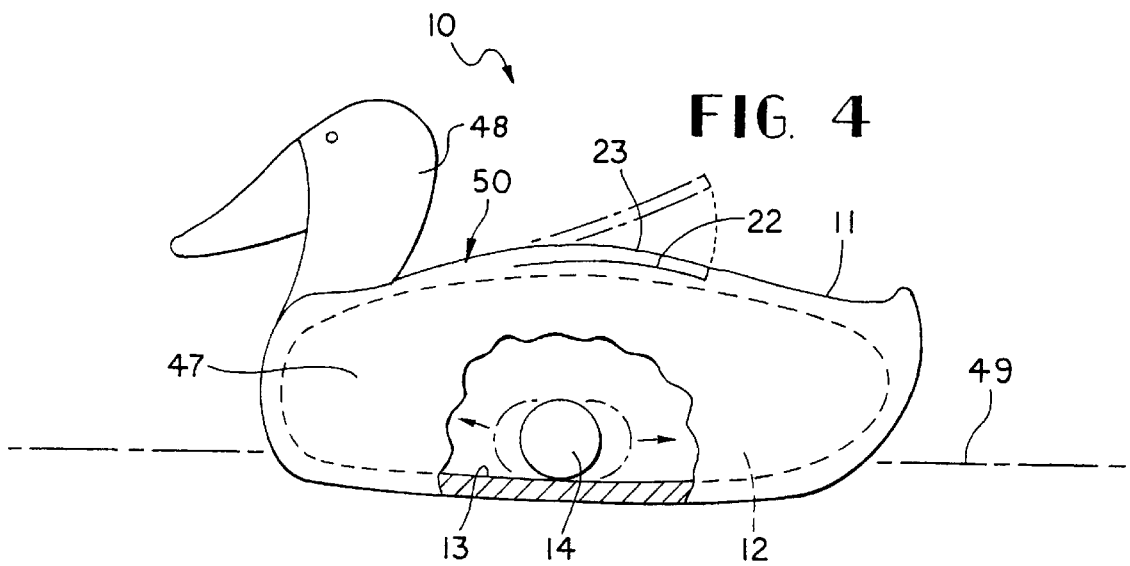
FIG. 4 is a side elevational view, partially in section, of a generally hollow duck decoy having a decoy movement device freely positioned within the decoy for imparting movement to the decoy in accordance with the present invention.

Referring to FIG. 4, decoy body 11 is illustrated as a duck decoy body 50 having a central body torso 47 and a head and neck member 48. Movement device 14 is inserted through opening 22 and freely positioned within torso 47. Once decoy body 50 is placed in water 49, the random movement of device 14 in torso 47 imparts a random swimming motion to the decoy body 50. Decoy body 50 may be traditionally anchored in the water 49 to further define the swimming motion as front to back and side to side movement. Moreover, movement of decoy body 50 in the water 49 causes ripples in the water 49 around the decoy body 50 which is further indicative of a live duck in the water.

Figure 3:
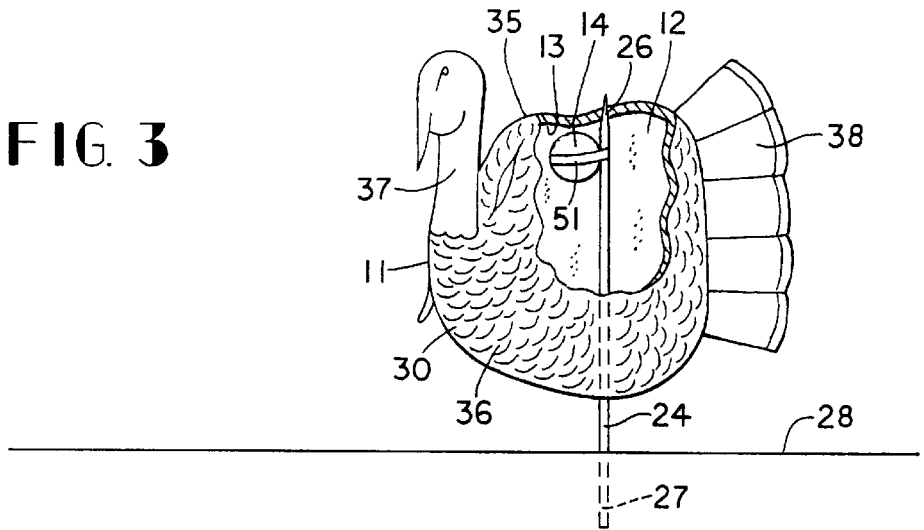
FIG. 3 is a side elevational view, partially in section, of a generally hollow wild turkey gobbler decoy mounted on a flexible support rod showing a decoy movement device attached directly to the support rod within the decoy for imparting movement to the decoy in accordance with the present invention.

Referring to FIGS. 3 and 5, decoy movement device 14 is secured directly to support rod 24 by any suitable means such as a rubber band or clamp 51. FIG. 3 illustrates the wild turkey gobbler decoy body 30 of FIG. 2 having all of the same elements as heretofore described with the exception that the first end 26 of the support rod 24 extends through torso 36 and engages the back portion 35 approximately midway between the head and neck member 37 and the tail member 38. Moreover, the movement device 14 is secured directly to the support rod 24 slightly beneath the back portion 35 of torso 36. The rotation of counterweight 21 within device 14 imparts a strutting motion to decoy body 30. More specifically, operation of device 14 causes decoy body 30 to rotate intermittently on support rod 24 simulating the circular movement of a strutting turkey. It also provides a vibration in the tail member 38, which is common in strutting turkeys. In even greater particularity, the rotation of counterweight 21 within device 14 causes the first end 26 of support rod 24 to oscillate in a generally circular manner. Each oscillation of the first end 26 will import a centrifugal rotative force to the decoy body 30 which will overcome the friction of engagement between the first end 26 and decoy body 30 allowing decoy body 30 to rotate intermittently on support rod 24. The degree of rotation of decoy body 30 after each oscillation of first end 26 will, of course, depend on several factors including the size and energy transmitted by device 14 and the size and weight of decoy body 30. Typically, body 30 will rotate approximately 1–10 degrees on support rod 24 after each oscillation of first end 26.

Referring again to FIG. 5, as an alternative embodiment of the goose body 40, the decoy movement device 14 is secured directly to the support rod 24 slightly beneath the back portion 44 of torso 41. Because of the anatomical design of body 40, the rotation of counterweight 21 within device 14 imparts a random bobbing or feeding motion to decoy body 40. Body 40 may also rotate intermittently on support rod 24 as described heretofore for decoy body 30.

FIGS. 6–9 each illustrate an alternative embodiment of decoy 10 comprising a foam decoy body 52 having a pair of generally flat sidewalls 53 disposed in side by side relation and connected together by any suitable means at their upper margins 54. Sidewalls 53 have the profile of a predetermined animal to be simulated. A decoy movement device 14, as described above, is strategically inserted in a predetermined location between sidewalls 53 for causing decoy body 52 to move in a predetermined manner. Likewise, a generally flexible support rod 24, as described above, having first 26 and second 27 ends flexibly and pivotally supports decoy body 52 a predetermined distance above the ground 28. The first end 26 of support rod 24 extends into and between sidewalls 53 engaging decoy body 52 whereas the second end 27 is inserted a predetermined distance into the ground 28. Again, during operation, support rod 24 is flexibly responsive to the movement of decoy body 52.

Figure 6:
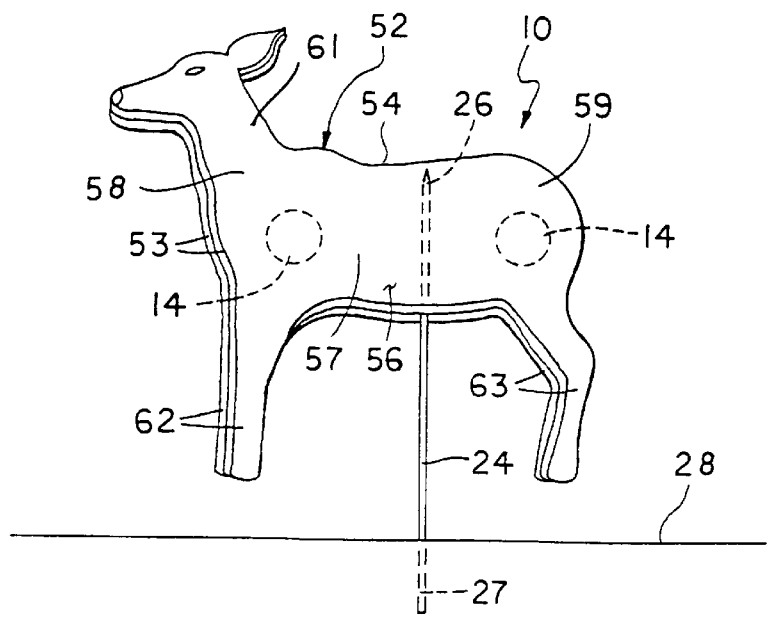
FIG. 6 is a side elevational view of a deer decoy having a pair of generally flat sidewalls in side by side relation mounted on a flexible support rod and showing alternate positions of a decoy movement device between the sidewalls for imparting movement to the decoy in accordance with the present invention.

Referring to FIG. 6, decoy body 52 is illustrated as either a fawn or adult deer decoy body 56 having a central body torso 57 with front 58 and rear 59 portions, a head and neck member 61, a pair of front legs 62, and a pair of rear legs 63. The first end 26 of support rod 24 extends into and between sidewalls 53 engaging torso 57 approximately midway between the front 62 and rear 63 legs and terminates approximately at the upper margins 54. Movement device 14 is strategically inserted and held in place by sidewalls 53 in the front portion 58 of torso 57 generally between the front legs 62. Alternatively, movement device 14 may be inserted in the rear portion 59 of torso 57 generally between the rear legs 63. In either case, the rotation of counterweight 21 within device 14 imports a back and forth rocking motion to decoy body 56 which is indicative of a walking or running deer. It is to be understood, however, that the frequency of the back and forth rocking motion of decoy body 56 may be controlled by changing the size of decoy body 56. For instance, a fawn decoy body 56 is smaller than an adult deer decoy body 56, therefore will oscillate back and forth at a higher frequency simulating a distress movement of running in place. The adult deer decoy body 56, having a larger size, will oscillate at a slower frequency simulating a walking in place movement. Furthermore, decoy body 56 may also rotate on support rod 24 as a result of the operation of device 14 and/or the wind because of its large flat cross-sectioned area.

Figure 8:
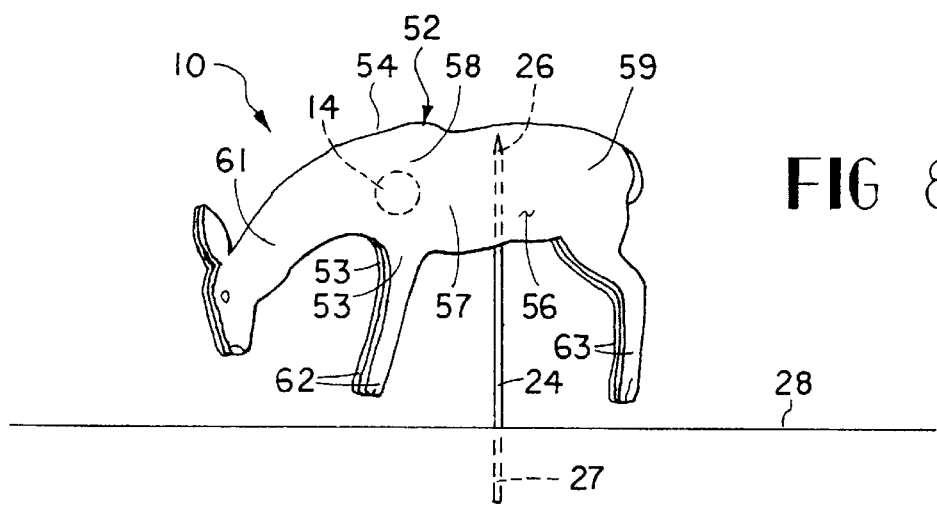
FIG. 8 is a side elevational view of the deer decoy in FIG. 6 except that the head and neck member is positioned in a head down feeding position.

Decoy body 56, as shown in FIG. 8, its substantially the same as that shown in FIG. 6 except that the head and neck member 61 is positioned in a generally head down feeding position relative to torso 57. As a result, the rotation of counterweight 21 within device 14 imports a feeding motion (i.e., bobbing) to decoy body 56.

Figure 7:
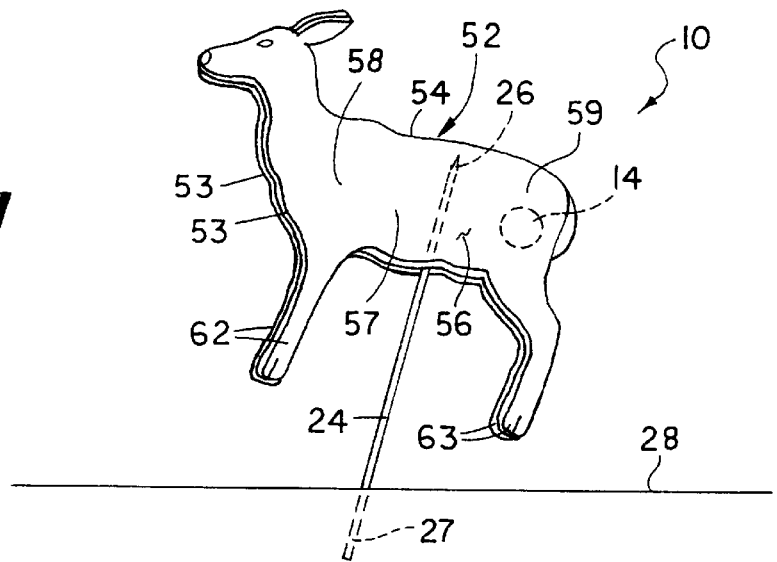
FIG. 7 is a side elevational view of the deer decoy in FIG. 6 except that the support rod is inserted into the ground at a predetermined angle such that the rear legs of the decoy are in close proximity to the ground.

Referring to FIG. 7, decoy body 56 is the same as that shown in FIG. 6. In this particular embodiment, the second end 27 of support rod 24 is inserted into the ground 28 at a predetermined or selectable angle such that the rear legs 63 are in close proximity to the ground 28. Movement device 14 is inserted in the rear portion 59 of torso 57 generally between the rear legs 63. The rotation of counterweight 21 within device 14 imports a wounded motion to the decoy body 56. More specifically, the decoy body 56 rocks back and forth with the rear legs 63 contacting the ground 28. This simulates a wounded deer having its hindquarters disabled, thus it appears that the deer is unable to stand which is particularly attractive for predators.

Figure 9:
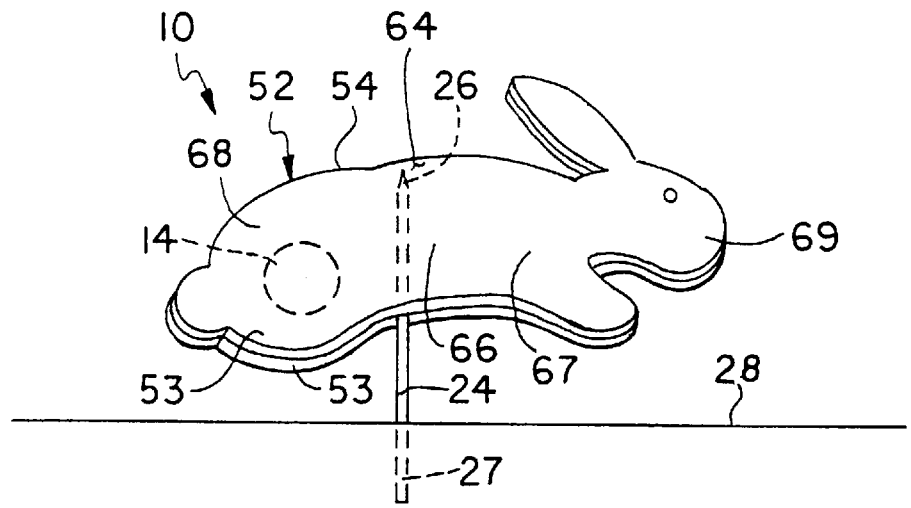
FIG. 9 is a side elevational view of a rabbit decoy having a pair of generally flat sidewalls in side by side relation mounted on a flexible support rod and showing a decoy movement device between the sidewalls for imparting movement to the decoy in accordance with the present invention.

Referring to FIG. 9, decoy body 52 is illustrated as a rabbit decoy body 64 having a central body torso 66 with front 67 and rear 68 portions and a head member 69. The first end 26 of support rod 24 extends into and between sidewalls 53 engaging torso 66 and terminates approximately at the upper margins 54. Movement device 14 is strategically inserted and held in place by sidewalls 53 in the rear portion 68 of torso 66. Alternatively, movement device 14 may be inserted in the front portion 67 of torso 66. In either case, the rotation of counterweight 21 within device 14 imports a rocking and quivering motion to decoy body 64 which simulates an animal caught and struggling to get away.

The present invention is also directed to a kit of parts for converting a non-animated decoy into an animated decoy. The kit comprises an insertable self contained decoy movement device 14, as described above, capable of being strategically positioned within a decoy 10 for imparting predetermined motion to the decoy 10. The kit further comprises a generally flexible support rod 24, as described above, and an attachment mechanism or clamp 51 for attaching the device 14 to rod 24.

It should be understood that commercially available decoys may be used for the above described decoy bodies. Although the invention is described with respect to the preferred embodiments, it is expected that various modifications may be made thereto without departing from the spirit and scope of the present invention. Therefore, the scope of the invention is to be determined by reference to the claims which follow.

What is claimed is:

1. An animated decoy, comprising:
    (a) a decoy body having a generally hollow interior; and
    (b) a freely movable decoy movement device removably positioned within said interior of said decoy body for movement therein, said movement device comprising a housing, a motor disposed within and connected to said housing, and a counterweight disposed within said housing and connected to said motor, said motor being effective for rotating said counterweight within said housing thereby causing said movement of said decoy movement device during operation of said motor, said housing of said movement device being free to move relative to said decoy body, said movement of said decoy movement device imparting motion to said decoy body;
    (c) wherein said decoy movement device is placed in a predetermined location within said interior of said decoy body;
    (d) wherein said decoy further comprises support means for flexibly and pivotally supporting said decoy body a predetermined distance above the ground, said support means responsive to said motion of said decoy body;
    (e) wherein said support means comprises a generally flexible support rod having first and second ends, said first end engaging said decoy body, said second end being inserted a predetermined distance into the ground.

2. An animated decoy as defined in claim 1, wherein:
    (a) said decoy body comprises a wild turkey hen decoy body having a central body torso, a head and neck member positioned in a generally head down feeding position relative to said torso, and a tail member;
    (b) said torso including a lower back portion, a breast portion and an opening for accepting said movement device therethrough;
    (c) said first end of said support rod extending into and engaging said lower back portion of said decoy body such that said breast portion is slightly lower than said tail member;
    (d) said movement device being positioned in said breast portion for imparting motion to said decoy body.

3. An animated decoy as defined in claim 1, wherein:
    (a) said decoy body comprises a wild turkey gobbler decoy body having a central body torso, a head and neck member, and a tail member;
    (b) said torso including a breast portion and an opening for accepting said movement device therethrough;
    (c) said first end of said support rod extending into and engaging said torso in close proximity to said tail member such that said breast portion is slightly lower than said tail member;
    (d) said movement device being positioned in said breast portion for imparting motion to said decoy body.

4. An animated decoy as defined in claim 1, wherein:
    (a) said decoy body comprises a goose decoy body having a central body torso, a head and neck member positioned in a generally head down feeding position relative to said torso, and a tail member;
    (b) said torso including a back portion, a breast portion and an opening for accepting said movement device therethrough;
    (c) said first end of said support rod extending into and engaging said back portion of said torso approximately midway between said head and neck member and said tail member such that said breast portion is slightly lower than said tail member;
    (d) said movement device being positioned in said breast portion for imparting motion to said decoy body.

5. An animated decoy, comprising:
(a) a generally hollow decoy body having an inner surface;
(b) a freely movable decoy movement device placed within said decoy body, said decoy movement device including a housing, a motor disposed within and connected to said housing, and a counterweight disposed within said housing and connected to said motor, said motor being effective for rotating said counterweight within said housing thereby causing movement of said decoy movement device during operation of said motor, said housing of said decoy movement device being free to move relative to said decoy body, said housing of said movement device impacting said inner surface of said decoy body causing said decoy body to move; and
(c) a generally flexible support rod having first and second ends for flexibly and pivotally supporting said decoy body a predetermined distance above the ground, said first end engaging said decoy body, said second end being inserted a predetermined distance into the ground, said support rod being flexibly responsive to said movement of said decoy body.

6. An animated decoy, comprising:
(a) a decoy body having a pair of generally flat sidewalls disposed in side by side relation and connected at their upper margins, said sidewalls having a profile of a predetermined animal; and
(b) a portable, removably insertable self-contained decoy movement device inserted between said sidewalls and retained in position by said sidewalls, for causing said decoy body to move, said decoy movement device comprising a housing, a motor operatively attached within said housing for rotation therein and a counterweight attached to said motor for rotation therewith;
(c) wherein said decoy further comprises support means for flexibly and pivotally supporting said decoy body a predetermined distance above the ground, said support means responsive to said motion of said decoy body.

7. An animated decoy as defined in claim 6, wherein said support means comprises a generally flexible support rod having first and second ends, said first end engaging said decoy body, said second end being inserted a predetermined distance into the ground.

8. An animated decoy as defined in claim 7, wherein:
(a) said decoy body comprises a deer decoy body having a central body torso with front and rear portions, a head and neck member, a pair of front legs, and a pair of rear legs;
(b) said first end of said support rod extending into and engaging said torso approximately midway between said front legs and said rear legs;
(c) said movement device being positioned in said front portion of said torso generally between said front legs for imparting motion to said decoy body.

9. An animated decoy as defined in claim 7, wherein:
(a) said decoy body comprises a deer decoy body having a central body torso with front and rear portions, a head and neck member, a pair of front legs, and a pair of rear legs;
(b) said first end of said support rod extending into and engaging said torso approximately midway between said front legs and said rear legs;
(c) said movement device being positioned in said rear portion of said torso generally between said rear legs for imparting motion to said decoy body.

10. An animated decoy as defined in claim 7, wherein:
(a) said decoy body comprises a deer decoy body having a central body torso with front and rear portions, a head and neck member positioned in a generally head down feeding position relative to said torso, a pair of front legs, and a pair of rear legs;
(b) said first end of said support rod extending into and engaging said torso approximately midway between said front legs and said rear legs;
(c) said movement device being positioned in said front portion of said torso generally between said front legs for imparting motion to said decoy body.

11. An animated decoy as defined in claim 7, wherein:
(a) said decoy body comprises a deer decoy body having a central body torso with front and rear portions, a head and neck member, a pair of front legs, and a pair of rear legs;
(b) said first end of said support rod extending into and engaging said torso approximately midway between said front legs and said rear legs, said second end of said support rod being inserted into the ground at a predetermined angle such that said rear legs of said decoy body are in close proximity to the ground;
(c) said movement device being positioned in said rear portion of said torso generally between said rear legs for imparting motion to said decoy body.

12. An animated decoy as defined in claim 7, wherein:
(a) said decoy body comprises a rabbit decoy body having a central body torso with front and rear portions, and a head member;
(b) said first end of said support rod extending into and engaging said torso;
(c) said movement device being positioned in said rear portion of said torso for imparting motion to said decoy body.

13. An animated decoy, comprising:
(a) a generally hollow decoy body;
(b) a generally flexible support rod having first and second ends for flexibly and pivotally supporting said decoy body a predetermined distance above the ground, said first end being disposed in direct contacting engagement with said decoy body, said second end being inserted a predetermined distance into the ground; and
(c) a self-contained decoy movement device secured to said support rod for imparting movement to said decoy body via said generally flexible support rod, said support rod being flexibly responsive to said movement of said decoy body, said decoy movement device comprising a housing, a motor disposed within and connected to said housing, and a counterweight disposed within said housing and connected to said motor, said motor being effective for rotating said counterweight within said housing thereby causing said movement of said decoy movement device; wherein:
(d) said decoy body comprises a wild turkey gobbler decoy body having a central body torso, a head and neck member, and a tail member;
(e) said torso including a back portion and an opening for accepting said movement device therethrough;
(f) said first end of said support rod extending into and engaging said back portion of said torso approximately midway between said head and neck member and said tail member;
(g) said movement device being secured to said support rod slightly beneath said back portion of said torso for imparting motion to said decoy body.

14. An animated decoy, comprising:
(a) a generally hollow decoy body;
(b) a generally flexible support rod having first and second ends for flexibly and pivotally supporting said decoy body a predetermined distance above the ground, said first end being disposed in direct contacting engagement with said decoy body, said second end being inserted a predetermined distance into the ground; and
(c) a self-contained decoy movement device secured to said support rod for imparting movement to said decoy body via said generally flexible support rod, said support rod being flexibly responsive to said movement of said decoy body, said decoy movement device comprising a housing, a motor disposed within and connected to said housing, and a counterweight disposed within said housing and connected to said motor, said motor being effective for rotating said counterweight within said housing thereby causing said movement of said decoy movement device; wherein:
(d) said decoy body comprises a goose decoy body having a central body torso, a head and neck member positioned in a generally head down feeding position relative to said torso, and a tail member;
(e) said torso including a back portion, a breast portion and an opening for accepting said movement device therethrough;
(f) said first end of said support rod extending into and engaging said back portion of said torso approximately midway between said head and neck member and said tail member such that said breast portion is slightly lower than said tail member;
(g) said movement device being secured to said support rod slightly beneath said back portion of said torso for imparting a random feeding motion to said decoy body.

15. A method for animating a decoy including a decoy body having a generally hollow interior, said method comprising the steps of:
acquiring a portable decoy movement device which is structurally independent of the decoy body, the decoy movement device comprising a housing, a motor disposed within the housing and connected to the housing and a counterweight connected to the motor for rotation within the housing;
imparting motion to the decoy, said step of imparting comprising the steps of:
activating the decoy movement device so the counterweight rotates within the housing;
positioning the decoy movement device within the hollow interior of the decoy body, said step of positioning being accomplished without the use of brackets;
flexibly supporting the decoy a predetermined distance above ground, wherein said step of flexibly supporting comprises the steps of:
obtaining a flexible support rod having first and second ends;
disposing a first end of the support rod into direct contacting engagement with the decoy body at a predetermined location;
inserting the second end of the support rod a predetermined distance into the ground.

16. A method for animating a decoy including a decoy body having a pair of generally flat side walls disposed in side by side relation and connected together at their upper margins, the sidewalls having the profile of a predetermined animal, said method comprising the steps of:
acquiring a decoy movement device comprising a housing, a motor disposed within the housing and connected to the housing, and a counterweight connected to the motor for rotation within the housing;
imparting motion to the decoy, said step of imparting comprising the steps of:
activating the decoy movement device so the counterweight rotates within the housing;
inserting the decoy movement device between the sidewalls of the decoy body; and
using the sidewalls of the decoy body to retain the decoy movement device in position within the decoy body;
flexibly supporting the decoy a predetermined distance above ground;
wherein said step of flexibly supporting comprises the steps of:
obtaining a flexible support rod having first and second ends;
inserting a first end of the support rod into the decoy body at a predetermined location;
inserting the second end of the support rod a predetermined distance into the ground;
wherein said step of inserting the decoy movement device comprises the step of locating the decoy movement device so the decoy movement device is spaced apart from and structurally independent of the flexible support rod.

* * * * *